UNITED STATES PATENT OFFICE.

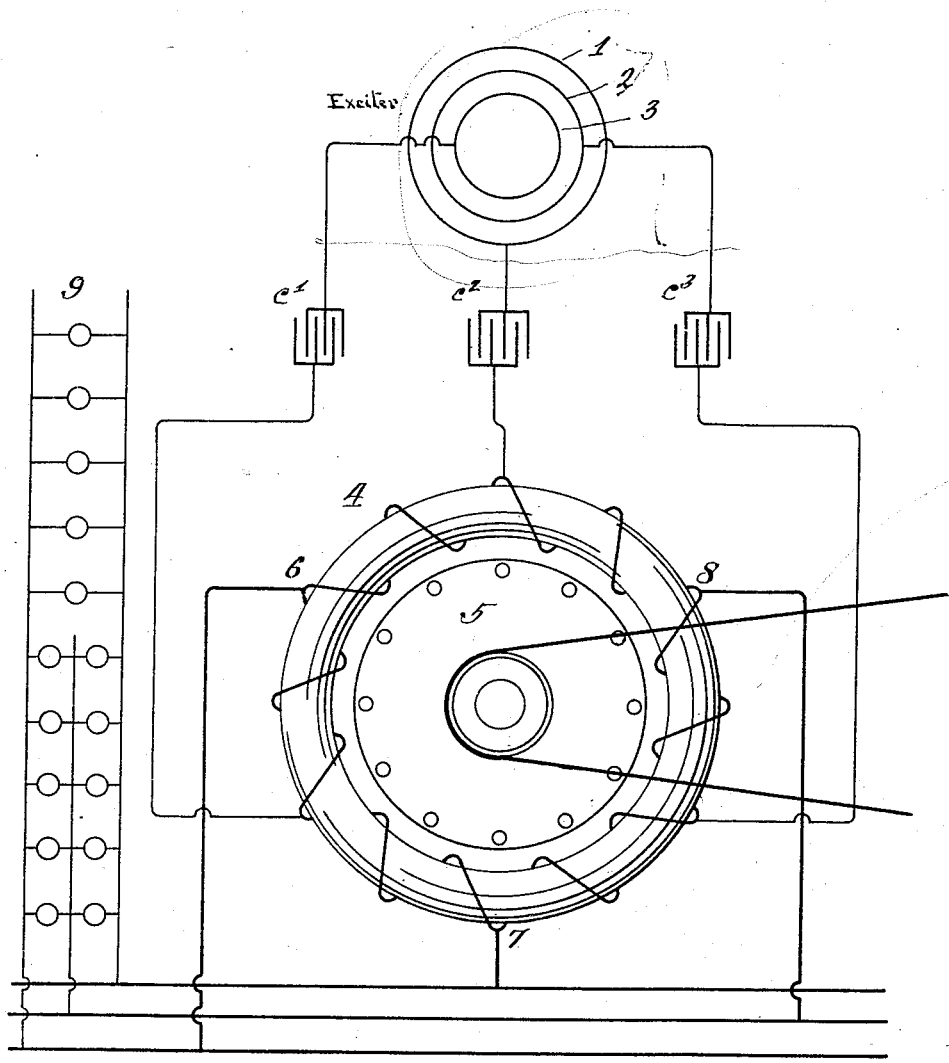

CHARLES S. BRADLEY, OF AVON, NEW YORK, ASSIGNOR TO GENERAL ELECTRIC COMPANY, A CORPORATION OF NEW YORK.

GENERATING ALTERNATING CURRENTS.

SPECIFICATION forming part of Letters Patent No. 718,083, dated January 13, 1903.

Application filed June 22, 1896. Serial No. 596,426. (No model.)

*To all whom it may concern:*

Be it known that I, CHARLES S. BRADLEY, a citizen of the United States, and a resident of Avon, in the county of Livingston and State of New York, have invented certain new and useful Improvements in Generating Alternating Currents, of which the following is a specification.

This invention relates to the generating of alternating currents by the inductive reaction of a magnetic field and a closed-circuited coöperating generator element driven above synchronism with relation to said field.

The object is to provide a generator which may be excited or have its magnetizing-currents furnished by an exciter of low voltage and which may be cut into a distribution-circuit supplied by another generator without the necessity of bringing the two generators into synchronism.

A further object is to permit the same winding to serve for the exciting or magnetizing circuit and for the generating-circuit.

In carrying out the invention an alternating-current exciter, and preferably a polyphase exciter, is employed to charge a rotary-field winding on the generator, and the rotary element of the generator is driven by a prime mover in the same direction as and faster than the poles of the rotary field. The rotary-field winding is also provided with connections for including it in the distribution-circuit, the reaction between the induced poles of the revolving element and those of the rotary field generating currents which are of the same time period or rate as those of the exciter-circuit. The points of connection of the distribution-circuit with the rotary-field winding are preferably intermediate between those with the exciter-circuits, thus preventing the distribution network short-circuiting the generator-windings, and vice versa, and insuring a better action of the generator under variations of load.

The invention comprises an alternating-current generator having a small exciter charging the magnetizing-circuit of one element through a condenser.

It comprises also such a generator having a magnetizing-circuit adjusted for electrical resonance.

It comprises also an induction-generator having a field-winding charged by an alternating-current exciter and intermediate connections for leading generated current from said winding to an external consumption-circuit.

The several features of novelty will be hereinafter fully described and definitely indicated.

In the drawing which diagrammatically illustrates the invention, 1 2 3 represent three contact-rings leading from an exciter-armature generating triphase alternating currents. A triphase system is shown by way of example merely, as a system of any order may be employed. The leads from the exciter connect at symmetrical points of a rotary-field winding on an induction-generator 4. The coöperating element 5 of the generator may be of any suitable type. As shown, it is provided with a squirrel-cage winding, consisting of conductors placed on or near the periphery of the core and connected together at the ends by conducting-disks. At symmetrical points of the rotary-field winding, and preferably at midway intermediate points, are tapped conductors 6 7 8 for leading off the currents generated by the motion of the revolving member. The latter is driven at a speed greater than the poles of the rotary field developed by the exciter-currents, thereby generating an electromotive force at the points 6 7 8.

9 is a distribution-circuit containing lamps or other translating devices adapted for operation with polyphase currents. In the several branches of the circuit connecting the exciter and the rotary-field winding are placed condensers $c'$ $c^2$ $c^3$ for adjusting the capacity-inductance product to produce electrical resonance. The exciter is preferably operated at constant speed and the condenser may therefore have a constant value. The proper value to determine resonance is such that the inductance of the circuit in henries multiplied by the capacity in microfarads equals twenty-five thousand three hundred divided by the square of the rate of alternation of the exciter. By employing condensers a small exciter of low electromotive force may be employed, and as the circuits are resonant, or approximately so, a large magnetizing-current flows in the rotary-field winding. It will be seen upon inspection of the drawing that the condensers are in series relation to the exciter and rotary-field windings, and this is a preferable mode of connection, as it permits a high voltage to be maintained at the generator-terminals of the rotary-field winding and a low voltage in the exciter, and this result will inhere whether the points of connection of the consumption-circuit be intermediate between or at the same points as the exciter connections.

When the exciting-circuit is adjusted for resonance, the potential between the exciter and condenser may be very low in comparison with that between the condenser and magnetizing-winding of the generator, by reason of the resonant rise of electromotive force at the condenser.

The exciter need not in all cases be polyphase. When induction-motors are connected in the distribution-circuit the reaction on the rotary-field winding will develop a rotary magnetic field even if charged by single-phase currents.

Having thus described my invention, what I claim as new, and desire to secure by Letters Patent, is—

1. An induction-generator for alternating currents comprising a magnetizing-winding in circuit with a dynamo-electric exciter, said circuit being adjusted relatively to the rate of alternation of said dynamo-electric exciter so as to be in electrical resonance, and means for operating the power-driven member above synchronism.

2. An alternating-current generator having the magnetizing-circuit of one member in circuit with a dynamo-electric exciter, the exciting-circuit being adjusted relatively to the rate of alternation of said dynamo-electric exciter so as to be in electrical resonance.

3. An alternating-current generator having the magnetizing-circuit of one member including a condenser adjusted for electrical resonance, and an exciter of low voltage.

4. An alternating-current generator having the magnetizing-circuit of one member including a small dynamo-electric exciter and a condenser in series relation.

5. An induction-generator having one element magnetized by a circuit including a low-voltage dynamo-electric exciter and a condenser, and means for driving the revolving element of the generator above synchronism with the rate of alternation of the exciter.

6. An induction-generator for alternating currents comprising a rotary-field magnetizing-winding, an exciter of definite rate of alternation charging the same, and a condenser coöperating with said exciter to supply magnetizing-current to the magnetizing-circuit.

7. An induction-generator for alternating currents comprising a rotary-field magnetizing-winding, a polyphase exciter of definite rate of alternation charging the same, and condensers in the several polyphase branches.

8. An induction-generator for alternating currents comprising a rotary-field magnetizing-winding, a polyphase exciter the circuit of which is adjusted for electrical resonance, and means for driving the generator above synchronism.

9. An induction-generator for alternating currents comprising a rotary-field winding supplied by an alternating-current exciter, a revolving element driven by a prime mover above synchronism, and a condenser connected in circuit between the exciter and the rotary-field winding and operating to assist the exciter to supply magnetizing-current to said rotary-field winding.

10. An induction-generator of alternating currents comprising a rotary-field winding supplied by a polyphase exciter, a revolving element driven by a prime mover above synchronism, and condensers in the circuit between the exciter and the rotary-field winding.

11. An induction-generator for alternating currents comprising a rotary-field winding supplied by a polyphase exciter, a revolving element driven by a prime mover above synchronism, and condensers in series relation to the exciter and rotary-field circuits.

12. An induction-generator of alternating currents comprising a rotary-field winding supplied by a polyphase exciter, a revolving element driven by a prime mover above synchronism, and condensers in the exciting-circuits adjusted to render said circuits electrically resonant.

13. An induction-generator for alternating currents comprising a rotary-field winding supplied by an alternating-current exciter, a revolving element driven by a prime mover above synchronism, and connections leading from intermediate points of the rotary-field winding for leading off generated currents.

14. An induction-generator for alternating currents comprising a rotary-field winding supplied by a polyphase exciter, a revolving element driven by a prime mover above synchronism, and connections at points midway between the exciter connections for leading off the generated currents.

15. The combination with an induction-generator, of a synchronous machine, and a condenser coöperating with said synchronous machine to supply magnetizing-current to the generator.

16. The combination with an induction-generator, of an exciting dynamo-machine, and a condenser for furnishing a portion of the excitation.

17. The combination with an induction-gen-